US008432779B2

United States Patent
Suh et al.

(10) Patent No.: US 8,432,779 B2
(45) Date of Patent: Apr. 30, 2013

(54) RECORDING MEDIUM WITH RESTRICTED PLAYBACK FEATURE AND APPARATUS AND METHODS FOR FORMING, RECORDING, AND REPRODUCING THE RECORDING MEDIUM

(75) Inventors: Sang Woon Suh, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 746 days.

(21) Appl. No.: 10/989,292

(22) Filed: Nov. 17, 2004

(65) Prior Publication Data

US 2005/0105432 A1  May 19, 2005

Related U.S. Application Data

(60) Division of application No. 10/789,992, filed on Mar. 2, 2004, which is a continuation of application No. PCT/KR03/01292, filed on Jul. 1, 2003.

(30) Foreign Application Priority Data

Jul. 2, 2002 (KR) .................. 10-2002-0037947
Sep. 10, 2002 (KR) .................. 10-2002-0054762

(51) Int. Cl.
*G11B 11/00* (2006.01)
(52) U.S. Cl.
USPC .................. 369/53.37; 369/275.3; 369/53.45; 369/59.25
(58) Field of Classification Search ............ 369/47.54, 369/53.21, 275.3; *G11B 7/00*
See application file for complete search history.

(56) References Cited

U.S. PATENT DOCUMENTS

| 4,748,609 A | | 5/1988 | Yonezawa et al. |
| 4,907,216 A | | 3/1990 | Rijnsburger |
| 5,051,998 A | * | 9/1991 | Murai et al. .................. 714/762 |
| 5,513,260 A | | 4/1996 | Ryan |
| 5,538,773 A | | 7/1996 | Kondo |
| 5,563,872 A | | 10/1996 | Horimai |
| 5,572,507 A | | 11/1996 | Ozaki et al. |
| 5,623,505 A | | 4/1997 | Funamoto et al. |
| 5,636,200 A | * | 6/1997 | Taira et al. .................. 369/275.3 |
| 5,706,047 A | * | 1/1998 | Lentz et al. .................. 347/262 |
| 5,706,268 A | | 1/1998 | Horimai |

(Continued)

FOREIGN PATENT DOCUMENTS

| CN | 1313599 | 9/2001 |
| CN | 1384491 | 12/2002 |

(Continued)

OTHER PUBLICATIONS

Memorex, White Paper Reference Guide Optical Media, Mar. 24, 2006.

(Continued)

*Primary Examiner* — Joseph Haley
*Assistant Examiner* — Parul Gupta
(74) *Attorney, Agent, or Firm* — Harness, Dickey & Pierce (57) ABSTRACT

A recording medium, such as a high-density and/or read-only recording medium, such as BD-ROM, capable of preventing unauthorized duplication of data streams, written thereon, onto another medium, such as a BD-RE or BD-R, which includes physical mark information, and to methods and apparatuses for forming, recording, reproducing, and restricting playback of the recording medium to prevent unauthorized duplication.

8 Claims, 10 Drawing Sheets

U.S. PATENT DOCUMENTS

| | | | |
|---|---|---|---|
| 5,724,327 A | 3/1998 | Timmermans et al. | |
| 5,737,286 A | 4/1998 | Timmermans et al. | |
| 5,809,007 A * | 9/1998 | Takemura et al. | 369/275.3 |
| 5,936,933 A | 8/1999 | Miyamoto et al. | |
| 5,940,364 A | 8/1999 | Ogata et al. | |
| 6,014,348 A | 1/2000 | Kim | |
| 6,070,799 A * | 6/2000 | Ashe | 369/47.12 |
| 6,081,785 A | 6/2000 | Oshima et al. | |
| 6,128,272 A | 10/2000 | Horimai et al. | |
| 6,137,758 A | 10/2000 | Nemoto | |
| 6,144,625 A | 11/2000 | Kuroda et al. | |
| 6,208,600 B1 | 3/2001 | Kimura et al. | |
| 6,266,299 B1 * | 7/2001 | Oshima et al. | 369/13.38 |
| 6,330,215 B1 * | 12/2001 | Lim | 369/53.2 |
| 6,353,890 B1 | 3/2002 | Newman | |
| 6,532,206 B2 | 3/2003 | Muramatsu et al. | |
| 6,535,477 B1 | 3/2003 | Muramatsu et al. | |
| 6,546,490 B2 | 4/2003 | Sako et al. | |
| 6,549,498 B1 | 4/2003 | Inoue et al. | |
| 6,580,678 B2 | 6/2003 | Kondo et al. | |
| 6,580,682 B1 | 6/2003 | Kamperman et al. | |
| 6,603,720 B1 | 8/2003 | Kuroda et al. | |
| 6,603,732 B2 | 8/2003 | Tosaki et al. | |
| 6,608,804 B2 | 8/2003 | Shim | |
| 6,671,249 B2 | 12/2003 | Horie | |
| 6,683,844 B2 | 1/2004 | Kuroda | |
| 6,694,023 B1 * | 2/2004 | Kim | 380/203 |
| 6,707,774 B1 | 3/2004 | Kuroda | |
| 6,707,785 B1 | 3/2004 | Kato | |
| 6,747,931 B1 | 6/2004 | Park | |
| 6,930,977 B1 | 8/2005 | Kondo et al. | |
| 6,938,162 B1 * | 8/2005 | Nagai et al. | 713/189 |
| 7,012,859 B2 | 3/2006 | Park | |
| 7,014,815 B1 | 3/2006 | Worthington et al. | |
| 7,028,011 B1 | 4/2006 | Ha et al. | |
| 7,035,172 B1 * | 4/2006 | Murata | 369/33.01 |
| 7,050,383 B2 * | 5/2006 | Nakajima et al. | 369/275.3 |
| 7,061,850 B1 * | 6/2006 | Irie et al. | 369/59.24 |
| 7,072,260 B1 | 7/2006 | Sako et al. | |
| 7,215,610 B2 | 5/2007 | Sako et al. | |
| 7,280,461 B2 * | 10/2007 | Endoh | 369/275.4 |
| 7,302,588 B2 * | 11/2007 | Sako et al. | 713/193 |
| 2001/0007545 A1 | 7/2001 | Ueda et al. | |
| 2001/0014077 A1 | 8/2001 | Muramatsu et al. | |
| 2001/0038603 A1 | 11/2001 | Kondo et al. | |
| 2001/0049662 A1 | 12/2001 | Linnartz et al. | |
| 2001/0054028 A1 | 12/2001 | Kuroda et al. | |
| 2002/0001274 A1 | 1/2002 | Nakajima et al. | |
| 2002/0015379 A1 | 2/2002 | Yamaguchi et al. | |
| 2002/0021635 A1 | 2/2002 | Park et al. | |
| 2002/0024898 A1 | 2/2002 | Kamiyama | |
| 2002/0024914 A1 | 2/2002 | Kobayashi | |
| 2002/0027855 A1 | 3/2002 | Shishido et al. | |
| 2002/0060968 A1 | 5/2002 | Senshu | |
| 2002/0110067 A1 | 8/2002 | Kondo et al. | |
| 2002/0145947 A1 | 10/2002 | Minamino et al. | |
| 2002/0181705 A1 | 12/2002 | Sako | |
| 2003/0002427 A1 | 1/2003 | Lee et al. | |
| 2003/0002430 A1 | 1/2003 | Kim et al. | |
| 2003/0012098 A1 | 1/2003 | Sako et al. | |
| 2003/0048705 A1 | 3/2003 | Wang et al. | |
| 2003/0067849 A1 | 4/2003 | Mikami | |
| 2003/0112736 A1 | 6/2003 | Muramatsu et al. | |
| 2003/0218950 A1 | 11/2003 | Yamada | |
| 2004/0001414 A1 | 1/2004 | Kadowaki et al. | |
| 2005/0111315 A1 * | 5/2005 | Hwang et al. | 369/47.14 |
| 2005/0213483 A1 | 9/2005 | Tomita et al. | |

FOREIGN PATENT DOCUMENTS

| | | |
|---|---|---|
| EP | 0 299 573 | 1/1989 |
| EP | 0 545 472 | 11/1992 |
| EP | 0 723 216 | 7/1996 |
| EP | 0 936 610 | 8/1999 |
| EP | 1 065 659 | 1/2001 |
| EP | 1 081 688 | 3/2001 |
| EP | 1 158 499 | 11/2001 |
| EP | 1 168 312 | 1/2002 |
| EP | 1 189 213 | 3/2002 |
| EP | 1 296 328 | 3/2003 |
| EP | 1 296 328 A1 | 3/2003 |
| EP | 1 126 446 | 11/2007 |
| JP | 04-274032 | 9/1992 |
| JP | 05-182368 | 7/1993 |
| JP | 5-266593 | 10/1993 |
| JP | 6-337763 | 6/1994 |
| JP | 06-275044 | 9/1994 |
| JP | 07-085574 | 3/1995 |
| JP | 08-087760 | 4/1996 |
| JP | 09-305396 | 11/1997 |
| JP | 10-143866 | 5/1998 |
| JP | 10-172149 | 6/1998 |
| JP | 10-177767 A | 6/1998 |
| JP | 10-222874 | 8/1998 |
| JP | 10-302381 | 11/1998 |
| JP | 10-326419 | 12/1998 |
| JP | 10-334574 | 12/1998 |
| JP | 08-036803 | 2/1999 |
| JP | 11-032328 | 2/1999 |
| JP | 11-102572 | 4/1999 |
| JP | 11-339268 | 12/1999 |
| JP | 2000-076141 | 3/2000 |
| JP | 2000-113466 | 4/2000 |
| JP | 2000-123479 | 4/2000 |
| JP | 2000-149414 | 5/2000 |
| JP | 2000-231722 | 11/2000 |
| JP | 2000-315355 | 11/2000 |
| JP | 2001-014796 | 1/2001 |
| JP | 2001-135021 | 5/2001 |
| JP | 2001-155410 | 6/2001 |
| JP | 2001-189015 | 7/2001 |
| JP | 2001-216727 | 8/2001 |
| JP | 2001-229547 | 8/2001 |
| JP | 2001-256655 | 9/2001 |
| JP | 2001-319339 | 11/2001 |
| JP | 2001-325747 | 11/2001 |
| JP | 2001-332031 A | 11/2001 |
| JP | 2002-132457 | 5/2002 |
| JP | 2002-182770 | 6/2002 |
| JP | 2002-319245 | 10/2002 |
| KR | 100239468 | 1/2000 |
| KR | 10-0275870 | 1/2001 |
| KR | 1999-0079395 | 9/2001 |
| KR | 2001-0088053 | 9/2001 |
| KR | 2001-0085952 | 12/2001 |
| KR | 2003-0004542 | 1/2003 |
| KR | 2003-0030506 | 4/2003 |
| TW | 346571 | 12/1998 |
| TW | 452766 | 9/2001 |
| TW | 514874 | 12/2002 |
| WO | WO 00/45381 | 8/2000 |
| WO | WO 01/11890 A1 | 2/2001 |
| WO | WO0115164 | 3/2001 |
| WO | WO 02/01560 | 6/2001 |
| WO | WO 01/88917 | 11/2001 |
| WO | WO 01/95327 A2 | 12/2001 |
| WO | WO 02/01560 * | 1/2002 |
| WO | WO 02/01560 A1 | 1/2002 |
| WO | WO 02/37493 | 5/2002 |
| WO | WO 03/094158 A1 | 11/2003 |
| WO | WO 2004/066283 | 8/2004 |

OTHER PUBLICATIONS

Philips Electronics; Formatter for Prerecorded Formats, 2004.
Philips Electronics; Formatter for Recordable-Rewritable Format, 2004.
Internet posting, Understanding the Design of the DVD+RW and DVD+R Disc Format., 2008.
Internet posting: Addressing Schemes for Optical Discs, 2008.
International Search Report dated Aug. 22, 2003.
International Search Report dated Oct. 23, 2003.
International Search Report dated May 27, 2004.
Chinese Office Action dated Mar. 17, 2006.
Japanese Office Action dated Nov. 20, 2006 for JP Application No. 2004-502291.

Japanese Search Report dated May 23, 2007 for JP Application No. 2004-502291.
Russian Office Action dated Jul. 6, 2007.
European Search Report dated Oct. 26, 2007.
Chinese Office Action dated Dec. 7, 2007.
Japanese Office Action dated Feb. 6, 2008 for JP Application No. 2004-519328.
Russian Office Action dated Feb. 28, 2008.
European Search Report dated Mar. 14, 2008.
European Search Report dated Mar. 25, 2008.
Korean Office Action dated May 30, 2008.
Japanese Office Action dated Jun. 3, 2008.
China Office Action dated Jul. 22, 2008.
China Office Action dated Mar. 2, 2007, with English Translation.
EP Search Report dated Feb. 13, 2006.
Korean Office Action dated Sep. 17, 2008—10-2002-0037947.
Japanese Office Action dated Sep. 24, 2008—JP2005-214336.
Japanese Office Action issued Mar. 10, 2009.
Yoshiyuki Kaneda, "Advanced Optical Disk Mastering and Its Application for Extremely High-Density Magnetic Recording," IEEE Transactions on Industrial Electronics, vol. 42, No. 3, Jun. 1995.
Isao Satoh, "Key Technology for High Density Rewritable DVD (DVD-RAM)," IEEE Transactions on Magnetics, vol. 34, No. 2, Mar. 1998.
Hiroshi Fuji, "Recording and Readout Using Clock Marks Premastered by Groove Wobbling," IEEE Transactions on Magnetics, vol. 36, No. 3, May 2000.
Office Action for corresponding Japanese Application No. 2005-210963 dated Jul. 14, 2009.
Office Action for corresponding Korean Application No. 10-2002-0077358 dated Jul. 16, 2009.
Office Action for corresponding U.S. Appl. No. 10/986,019 dated Mar. 23, 2009.
Office Action for corresponding U.S. Appl. No. 10/986,019 dated Aug. 25, 2009.
Office Action for corresponding Japanese Application No. 2006-502712 dated Sep. 1, 2009.
Office Action for corresponding Japanese Application No. 2006-502712 dated Jul. 30, 2010.
Office Action for corresponding Korean Application No. 10-2003-0073800 dated Mar. 17, 2010.
Office Action for corresponding Japanese Application No. 2004-502291 dated Mar. 23, 2010.
Office Action for corresponding Taiwanese Application No. 093104152 dated Oct. 13, 2010.
Office Action for corresponding Taiwanese Application No. 093127674 dated Oct. 18, 2010.
Office Action for corresponding Japanese Application No. 2004-519328 dated Nov. 24, 2010.
Office Action for corresponding Japanese Application No. 2005-210963 dated Mar. 1, 2011.
Notice of Allowance for U.S. Appl. No. 10/789,992 dated Aug. 4, 2011.
Office Action dated Sep. 2, 2011 by the Japanese Patent Office for Japanese Application No. 2006-502712.
Notice of Allowance dated Aug. 4, 2011 by the USPTO for corresponding U.S. Appl. No. 10/789,992.
Notice of Allowance issued by the Korean Patent Office on Jul. 12, 2011.
European Search Report issued by the European Patent Office on Aug. 4, 2011.
DVD-RAM Technique.
Office Action for corresponding Japanese Application No. 2005-210963 dated Jan. 4, 2012.
Chinese Office Action dated Mar. 2, 2007 with English translation.
European Search Report dated Feb. 17, 2006.

* cited by examiner

FIG. 1

Prior Art

FIG. 2

Prior Art

Physical BD-ROM ID Mark
( Wobbled Pit Type )

|  | BD-RE | BD-ROM | BD-R for authoring | BD-R |
|---|---|---|---|---|
| Pre-recorded Area (PIC area) | HFM Groove | Wobble Pit or Normal Pit | Monotone HFM Groove & Normal Pit | Wobbled Pit |
| Writable Area | Wobbled Groove | Normal Pit | Wobbled Groove | Wobbled Groove |

RECORDING MEDIUM WITH RESTRICTED PLAYBACK FEATURE AND APPARATUS AND METHODS FOR FORMING, RECORDING, AND REPRODUCING THE RECORDING MEDIUM

CROSS-REFERENCE TO RELATED APPLICATIONS

This application is a divisional of, and claims priority under 35 U.S.C. §120 to U.S. Nonprovisional application Ser. No. 10/789,992 filed on Mar. 2, 2004, which is a continuation of PCT International Application No. PCT/KR2003/001292 filed on Jul. 1, 2003, the entire contents of which are hereby incorporated by reference, which further claims priority on Korean Patent Application No. 10-2002-0037947, filed on Jul. 2, 2002 and Korean Patent Application No. 10-2002-0054762 filed on Sep. 10, 2002, the entire contents of each which are also hereby incorporated by reference.

BACKGROUND OF THE INVENTION

1. Field of the Invention

The present invention relates to a recording medium such as BD-ROM (Blu-ray Disc ROM) which has a capability to restrict unauthorized duplication of data written therein, which includes physical mark information and an apparatus and methods for forming, recording, reproducing, and restricting reproduction of illegally duplicated recording media.

2. Description of the Related Art

Recently, standardization of new high-density rewritable optical discs has rapidly progressed, for example, BD-RE (Blu-Ray Disc Rewritable), which can store a large quantity of high-quality video and audio data. As a result, products associated with such discs have also been developed. Such products are expected to be commercially available in the near future.

Figure 1:
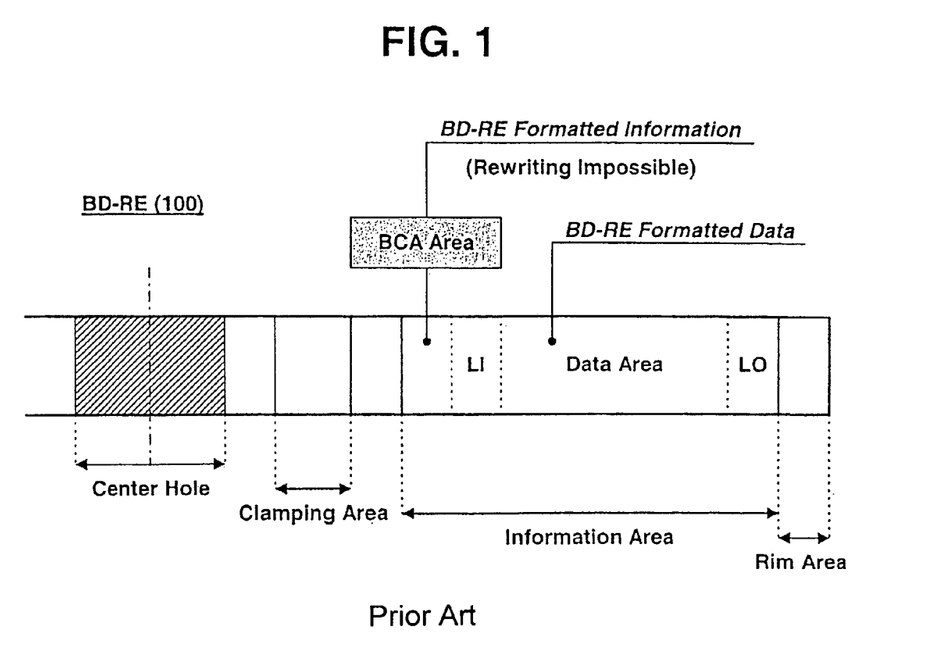
FIG. 1 is a diagram illustrating the disc structure of a conventional BD-RE.

Referring to FIG. 1, the disc structure of a conventional BD-RE is shown. As shown in FIG. 1, the BD-RE has a center hole and a clamping area which are adapted to allow the optical disc to be loaded in position in an optical disc apparatus. The optical disc also has an information area for recording disc management information and data thereon.

A lead-in area (LI), a data area, and a lead-out area (LO) are assigned to the information area. A burst cutting area (BCA) is assigned to the area preceding the lead-in area. The BCA, which is not a writable area, contains information modulated into a format unique to BD-RE.

Figure 2:
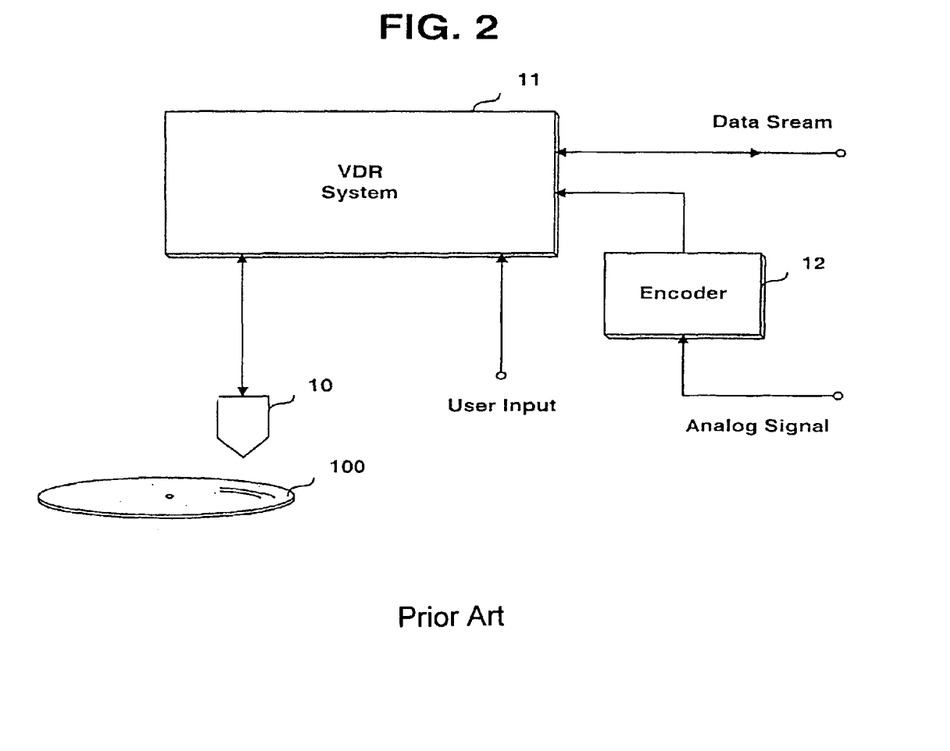
FIG. 2 is a schematic block diagram illustrating the configuration of a conventional BD-RE recorder.

Referring to FIG. 2, an example of an optical disc apparatus applicable to BD-RE is shown. As shown in FIG. 2, the optical disc apparatus includes an optical pickup 10, a video disc recorder (VDR) system 11, and an encoder 12. The optical disc apparatus performs a data recording operation for encoding and modulating data, externally input thereto, into a format unique to BD-RE, and then recording the modulated data on a data area assigned to the information area of the BD-RE. The optical disc apparatus also performs a data reproduction operation for reading out data recorded on the data area, and processing the read-out data to reproduce original video and audio data.

The optical disc apparatus having the above-mentioned configuration can record audio/video (A/V) data of a movie or broadcasted program on a BD-RE optical disc 100, and subsequently reproduce the recorded A/V data from the BD-RE optical disc 100 in the form of high-quality video and audio.

The development and standardization of high-density read-only optical discs, such as BD-RE and its read-only counterpart, BD-ROM (Blu-ray Disc Read-Only Memory), and write-once Blu-ray discs such as BD-R (Blu-ray Disc Recordable) have recently been progressing. However, there is no effective solution for preventing unauthorized duplication of data streams, written on a BD-ROM, or onto other optical discs, such as BD-RE or BD-R.

SUMMARY OF THE INVENTION

In exemplary embodiments, the present invention is directed to a recording medium, such as a high-density and/or read-only recording medium, such as BD-ROM, capable of preventing unauthorized duplication of data streams, written thereon, onto another medium, such as a BD-RE or BD-R, and to methods and apparatuses for forming, recording, reproducing, and restricting playback of the recording medium to prevent unauthorized duplication.

In exemplary embodiments, the present invention is directed to a recording medium, such as a high-density and/or read-only recording medium, such as BD-ROM, capable of preventing unauthorized duplication of data streams, written thereon, onto another medium, such as a BD-RE or BD-R, which includes physical mark information and to methods and apparatuses for forming, recording, reproducing, and restricting playback of the recording medium to prevent unauthorized duplication.

In an exemplary embodiment, the present invention is directed to a recording medium including recorded data, the recording medium including an information area for recording disc management information and/or data, the information area includes a lead-in area, a data area, and a lead-out area and physical mark information, recorded as a wobbled pit pattern in an area preceding the lead-in area, in the lead-in area, in the data area, in the lead-out area, or in an area following the lead-out area of the information area.

In another exemplary embodiment, the present invention is directed to a method of forming a recording medium, including forming an information area for recording disc management information and/or data, the information area includes a lead-in area, a data area, and a lead-out area and forming physical mark information as a wobbled pit pattern in an area preceding the lead-in area, in the lead-in area, in the data area, in the lead-out area, or in an area following the lead-out area of the information area.

In another exemplary embodiment, the present invention is directed to a method of reproducing data from a recording medium, including utilizing physical mark information to control reproduction of the recorded data, wherein physical mark information has been recorded as a wobbled pit pattern in an area of the recording medium.

In another exemplary embodiment, the present invention is directed to a method of recording data on a recording medium, including recording the data in an information area, which includes a lead-in area, a data area, and a lead-out area and recording physical mark information as a wobbled pit pattern in an area of the information area, which controls reproduction of the recorded data.

In another exemplary embodiment, the present invention is directed to an apparatus for reproducing data from a recording medium, the apparatus utilizing physical mark information to control reproduction of the recorded data, wherein the physical mark information has been recorded as a wobbled pit pattern in an area of the recording medium.

In another exemplary embodiment, the present invention is directed to a recording medium including recorded data including disc identification information identifying the type of recording medium and a data format of the data on the recording medium to control reproduction of the recorded data.

In another exemplary embodiment, the present invention is directed to a method of forming a recording medium including forming disc identification information identifying the type of recording medium and forming the data on the recording medium in a desired data format.

In another exemplary embodiment, the present invention is directed to a method of reproducing data from a recording medium including utilizing disc identification information and a data format of the data to control reproduction of the recorded data.

In another exemplary embodiment, the present invention is directed to a method of recording data on a recording medium including recording the data in an information area and recording disc identification information in the information area, which controls reproduction of the recorded data.

In another exemplary embodiment, the present invention is directed to an apparatus for reproducing data from a recording medium, said apparatus utilizing disc identification information and a format of recorded data to control reproduction of the recorded data.

BRIEF DESCRIPTION OF THE DRAWINGS

Features and advantages of the exemplary embodiments of the present invention will become more apparent after reading the following detailed description when taken in conjunction with the drawings, in which.

DETAILED DESCRIPTION OF EXEMPLARY EMBODIMENTS

Hereinafter, exemplary embodiments of a recording medium, such as a high-density and/or optical disc according to the present invention, and an apparatus and a method for forming, recording, reproducing, and restricting playback of the high-density optical disc in accordance with the present invention will be described in detail with reference to the attached drawings.

Figure 3:
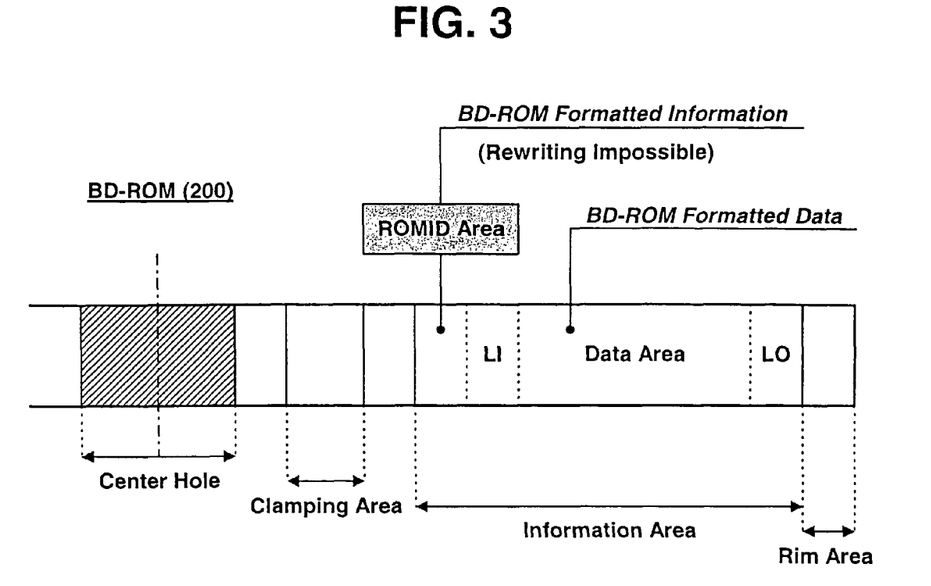
FIG. 3 is a diagram illustrating the disc structure of a BD-ROM according to an exemplary embodiment of the present invention.

Referring to FIG. 3, the disc structure of a BD-ROM according to an exemplary embodiment of the present invention is shown. As shown in FIG. 3, the BD-ROM 200 has a center hole and a clamping area which are adapted to allow the BD-ROM 200 to be loaded in position in an optical disc apparatus. The BD-ROM 200 also has an information area on which disc management information and data have been recorded.

A lead-in area (LI), a data area, and a lead-out area (LO) may be assigned to the information area. A disc identification area, for example, a 'BD-ROM identification (ROMID)' area, can be assigned to the area preceding the lead-in area (LI). The ROMID area may correspond to the BCA of the BD-RE described with reference to FIG. 1. The ROMID area also can be assigned to a particular region of the lead-in (LI) or lead-out area (LO).

The ROMID area, which is not a writable area, may contain identification information indicating that the associated disc is of a BD-ROM type. This identification information can be modulated and recorded into a format unique to BD-ROM, for example, a physical BD-ROM ID mark.

Figure 4:
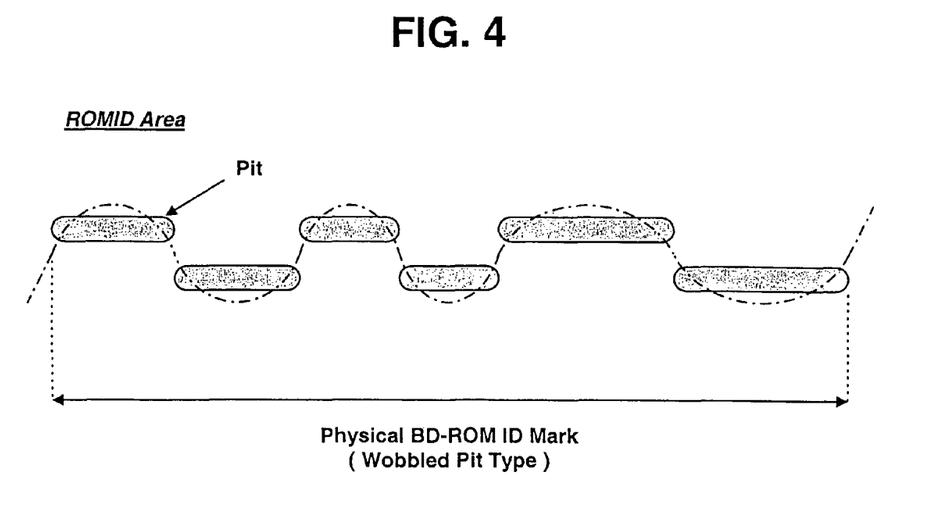
FIG. 4 is a schematic view illustrating physical disc identification information recorded in the form of a wobbled pit pattern in accordance with an exemplary embodiment of the present invention.

As shown in FIG. 4, the physical BD-ROM ID mark can be recorded in the form of a wobbled pit pattern. The physical BD-ROM ID mark can be detected at an initial stage of a servo operation, independent of a decoding operation for reproducing data. The wobbled pit pattern of the physical BD-ROM ID mark can represent an encryption key value used in encrypting the data to be written on the data area, for example, duplication preventing information.

Data encoded and modulated into a format unique to BD-ROM is recorded on the data area assigned to the information area. This data is written in a mastering process during the manufacture of the associated disc.

Figure 5:
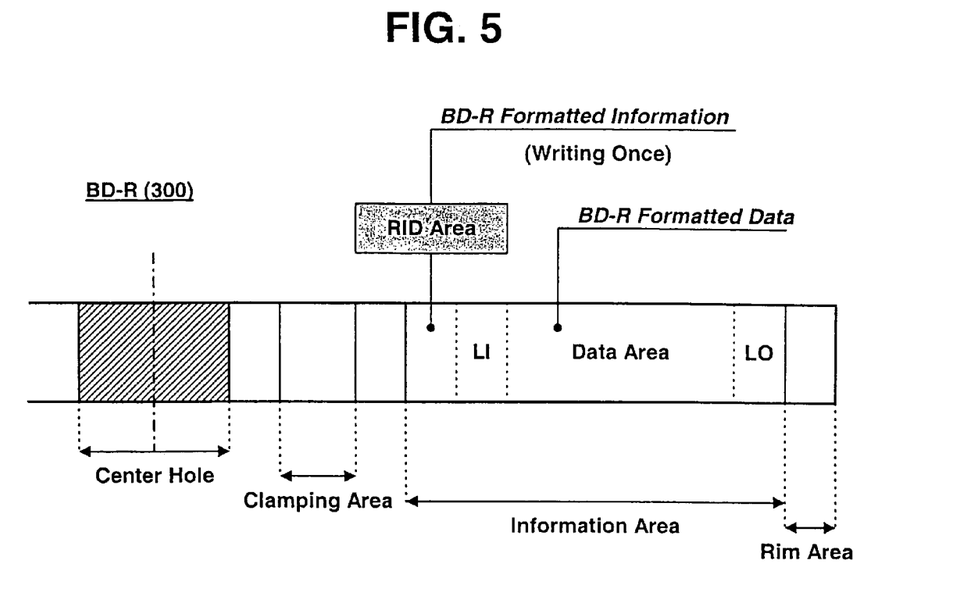
FIG. 5 is a diagram illustrating the disc structure of a BD-R according to an exemplary embodiment of the present invention.

FIG. 5 illustrates the disc structure of a Blu-ray write-once, that is, BD-R, in accordance with an exemplary embodiment of the present invention. As shown in FIG. 5, the BD-R 300 has a center hole and a clamping area which are adapted to allow the BD-R 300 to be loaded in position in an optical disc apparatus. The BD-R 300 also has an information area for recording disc management information and data thereon.

A lead-in area (LI), a data area, and a lead-out area (LO) may be assigned to the information area. A disc identification area, for example, a 'BD-R identification (RID)' area, also can be assigned to the area preceding the lead-in area. The RID area may correspond to the BCA of the BD-RE described with reference to FIG. 1.

The RID area, which is a writable area, may contain identification information representing the fact that the associated disc is of a BD-R type. The identification information can be modulated and recorded into a format unique to BD-R, that is, a physical BD-R ID mark.

The physical mark can also recorded in the form of a wobbled pit pattern, as shown in FIG. 4. The physical BD-R ID mark can be detected at the initial stage of a servo operation, independent of a decoding operation for reproducing data.

The physical mark can also be recorded in the form of a pit pattern other than the wobbled pit pattern. Using a physical mark having a pit pattern other than the wobbled pit pattern, it is possible to write data on the data area in an encrypted state, and to decrypt the encrypted data read out from the data area. This is described in more detail below.

Physical mark information, which is recorded on a desired recording area, for example, a lead-in area or a particular area (ROMID or RID area) preceding the lead-in area, in a BD-ROM or a BD-R authored for manufacture of BD-ROM, can be written to have a pattern of repeated mark/space pairs with respect to a monotone high-frequency-modulated (HFM) groove. Each mark/space pair may include a mark and a space each having an optional length.

Figure 6:
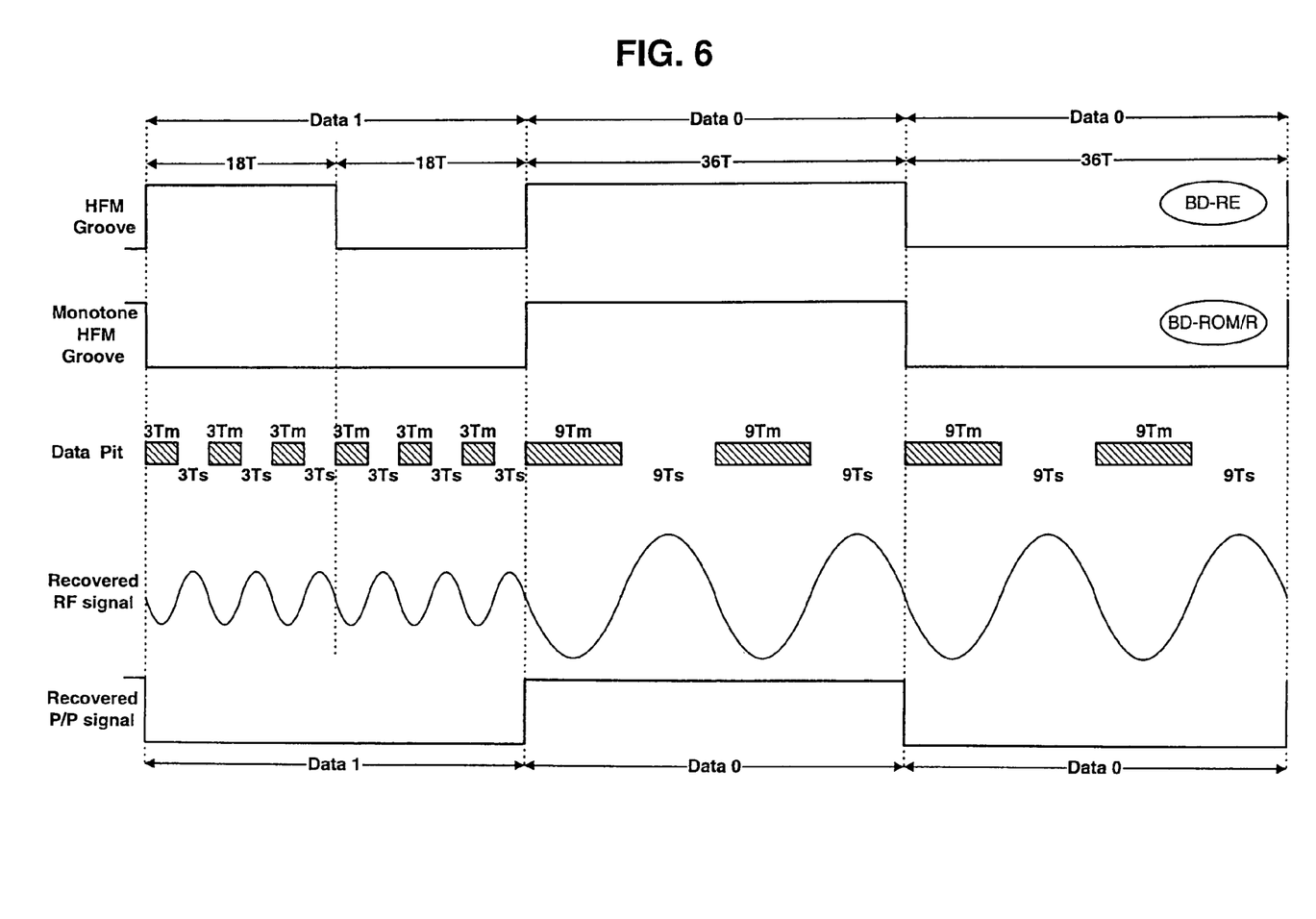
FIG. 6 is a schematic view illustrating physical disc identification information recorded in the form of aligned pit strings in accordance with an exemplary embodiment of the present invention.

For example, as shown in FIG. 6, the physical mark information may be written with respect to a monotone HFM groove in which every recording field having a length of 36T has either a high level or a low level, irrespective of the data sequence value of the physical mark information. Where the data value of a 36T recording field is "1", a mark/space pair including a mark having a length of 3T (3Tm) and a space having a length of 3T (3Ts) may be repeatedly recorded 6 times in the 36T recording field to form a pattern of 6 aligned mark/space pairs. Where the data value of the 36T recording field is "0", a mark/space pair including a mark having a length of 9T (9Tm) and a space having a length of 9T (9Ts) may be repeatedly recorded 2 times in the 36T recording field to form a pattern of 2 aligned mark/space pairs.

In the latter case, where the data value of the 36T recording field is "0", a mark having a length of 12T (12Tm), a space having a length of 12T (12Ts), and a mark having a length of 12T (12Tm) may be sequentially recorded in the 36T recording field. In this case, however, errors may occur during a tracking servo operation, because the frequencies of RF and push-pull signals may be lowered due to the 12T length of the marks and space. In another exemplary embodiment, repeated mark/space pairs are recorded each including a mark of 9T (9Tm) and a space of 9T (9Ts) which are capable of maintaining respective RF and push-pull signals at appropriate frequencies.

Where physical mark information is recorded to have a wobbled pit pattern, as described above with reference to FIG. 4, the wobbled pits can be formed using mastering equipment adapted to manufacture BD-ROMs. However, such wobbled pits cannot be recorded in general disc drivers, for example, BD-R drivers, because the wobbling frequency is beyond the driving frequency band of an actuator used in BD-R drivers. As a result, it is impossible to duplicate BD-ROMs, using BD-R drivers.

In other words, in a BD-R authored for manufacture of BD-ROM, that is, a BD-R for authoring, it is possible not only to record physical mark information, but also to record essential disc information (DI) to be permanently recorded and maintained in an area, such as a permanent information & control (PIC) data region included in the lead-in area of the BD-R, by applying a recording technique in which repeated mark/space pairs, each including a mark and a space, each having an optional length, are recorded such that they are aligned with one another, with respect to a monotone HFM groove. On the other hand, recording of data in the writable area of the BD-R is achieved with respect to each typical wobbled groove.

Figure 7:
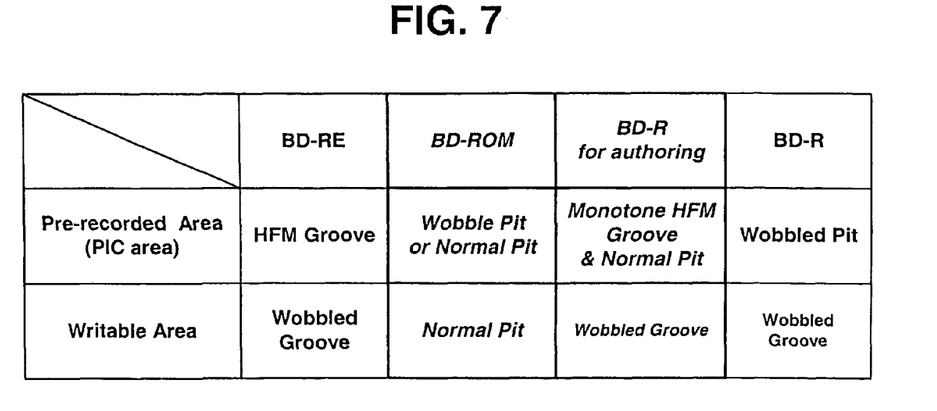
FIG. 7 is a table for comparing data recording formats of BD-ROM, BD-RE, BD-R, and BD-R for authoring.

In the case of BD-ROM, wobbled pits or normal pits can be recorded in the area, such as the PIC region of the BD-ROM, whereas data having the form of general pit strings is recorded in the data recording area of the BD-ROM. Accordingly, optical disc apparatuses can more easily distinguish the type of any optical disc, for example, BD-RE or general BD-R, by referring to a pit string recorded in the form of a unique pattern in an area, such as the PIC region of the optical disc.

Figure 8:
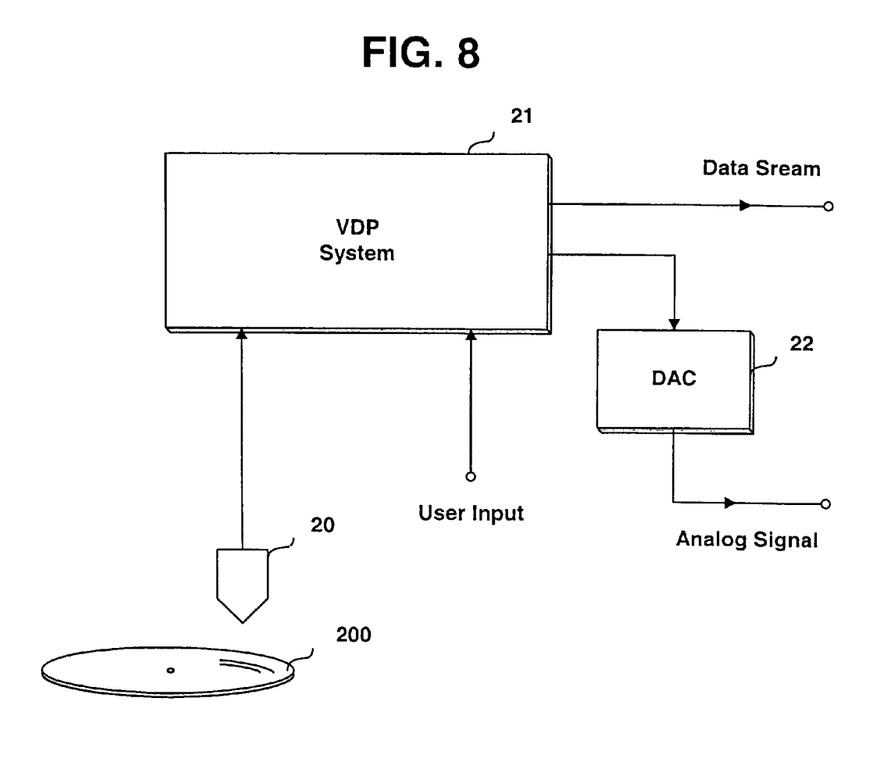
FIG. 8 is a schematic block diagram illustrating the configuration of an optical disc apparatus to which a playback restricting method according to an exemplary embodiment of the present invention is applied.

Accordingly, in the case of an optical disc apparatus adapted to play back a BD-ROM or BD-R recorded with the above described physical mark information, for example, a BD-ROM player including an optical pickup 20, a VDP system 21, and a D/A converter 22, as shown in FIG. 8, the BD-ROM player detects and identifies the physical mark information at the initial stage of a typical servo operation thereof carried out when an optical disc is loaded, detects and identifies the unique format of data read out from the data area of the optical disc during a data reproduction operation thereof, thereby determining whether or not the data was illegally duplicated on the optical disc, so as to perform a playback restricting operation by stopping playback of the optical disc in accordance with the result of the determination. These operations will be described in detail hereinafter.

Figure 9A:
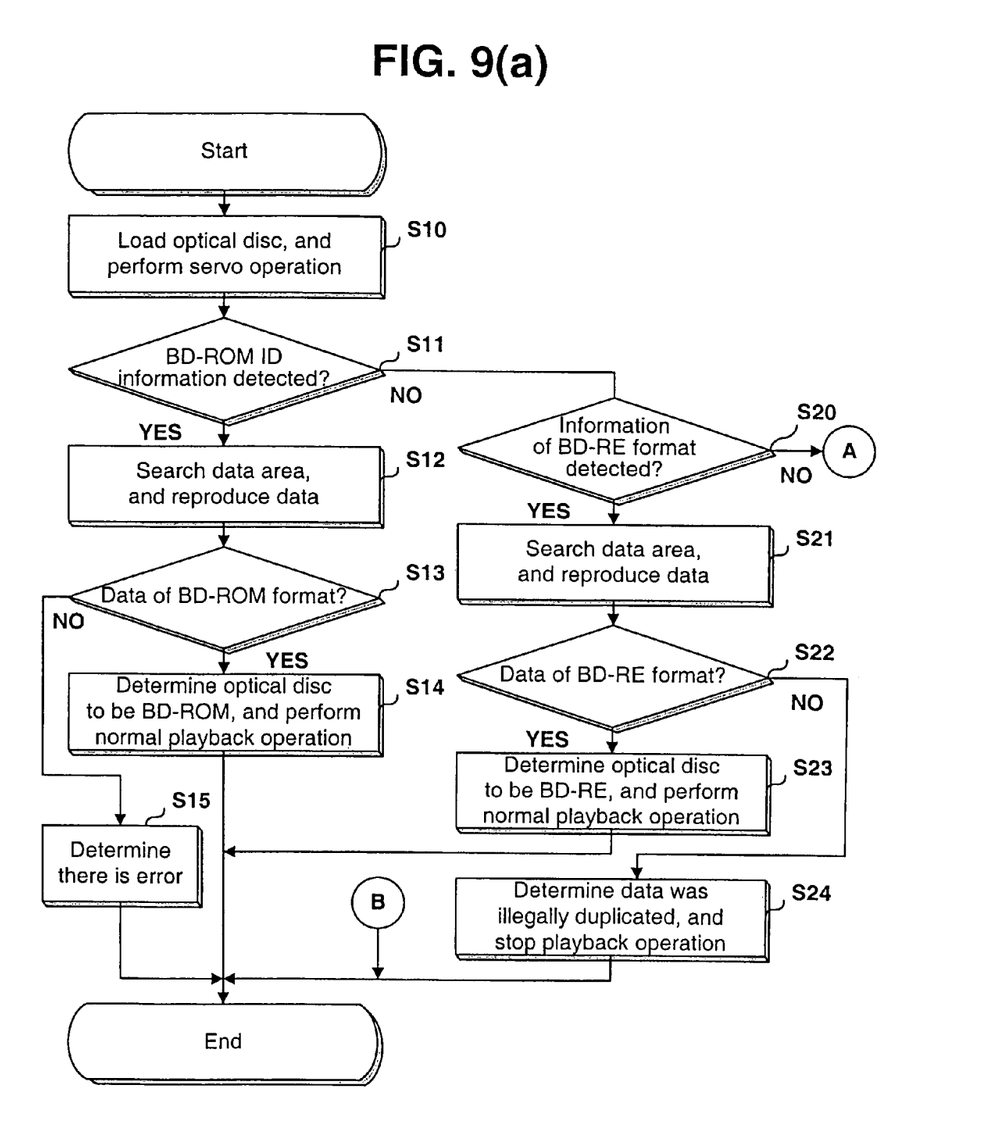
FIGS. 9a and 9b are flow charts illustrating sequential processes of the playback restricting method carried out in the optical disc apparatus in accordance with an exemplary embodiment of the present invention.
Figure 9B:
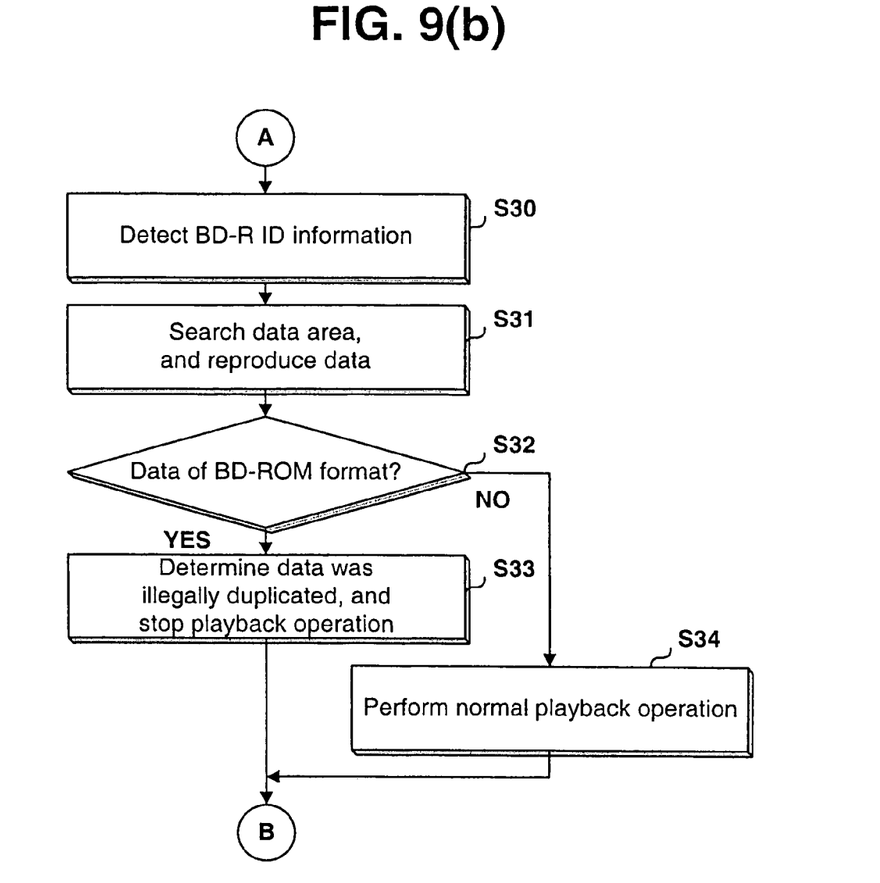

FIGS. 9a and 9b are flow charts illustrating a method for restricting playback of an optical disc in an optical disc apparatus in accordance with an exemplary embodiment of the present invention.

In the optical disc apparatus shown in FIG. 8, a typical focusing and tracking servo operation is carried out by the VDP system 21 when an optical disc is loaded in the optical disc apparatus (S10), as shown in FIG. 9a.

At the initial stage of the servo operation, the VDP system 21 accesses a disc identification area preceding a lead-in area, in the data area, in the lead-out area, or in an area following the lead-out area of the information area of the optical disc, to detect and identify physical mark information recorded in the disc identification area. For example, where it is determined that the physical mark information corresponds to ID information associated with BD-ROM (S11), the VDP system 21 determines that the loaded optical disc is a BD-ROM.

Subsequently, the VDP system 21 searches a data area assigned to an information area of the optical disc, and performs a data reproduction operation for reading out data recorded in the data area, and reproducing the read-out data (S12). Where the data read out in the above described procedure has a format unique to BD-ROM, that is, the read-out data is BD-ROM format data (S13), the VDP system 21 determines the loaded disc to be a normal BD-ROM, and continues the data reproduction (playback) operation (S14).

On the other hand, where the read-out data does not have the format unique to BD-ROM, that is, it is not BD-ROM format data, the VDP system 21 determines that there is an error in determining the type of the optical disc (S15). In this case, the VDP system 21 stops the data reproduction (playback) operation or performs the disc determining operation again.

Where the physical mark information recorded in the disc identification area does not correspond to BD-ROM ID information, for example, where information recorded in accordance with a format unique to BD-RE is detected (S20), the VDP system determines the loaded optical disc to be BD-RE.

The VDP system 21 searches the data area assigned to the information area, and then performs a data reproduction operation for reading out data recorded in the data area, and reproduces the read-out data (S21). Where the data read out has a format unique to BD-RE, that is, the read-out data is BD-RE format data (S22), the VDP system 21 determines the loaded optical disc to be a normal BD-RE, and continues the data reproduction (playback) operation (S23).

On the other hand, where the read-out data does not have the format unique to BD-RE, for example, where it is BD-ROM format data, the VDP system 21 determines that BD-ROM data was illegally duplicated on a BD-RE, and displays a report message, while performing a playback restricting operation to stop the data reproduction operation (S24).

Where BD-R ID information is detected from the physical mark information recorded in the disc identification area (S30), the VDP system 21 determines the loaded optical disc to be BD-R. In this case, the VDP system 21 searches the data area assigned to the information area, and then performs a data reproduction operation for reading out data recorded in the data area, and reproducing the read-out data (S31).

Where it is subsequently determined that the data read out has a format unique to BD-ROM, that is, the read-out data is BD-ROM format data (S32), the VDP system 21 determines that BD-ROM data was illegally duplicated on a BD-R, and displays a report message, while performing a playback restricting operation to stop the data reproduction operation (S33).

On the other hand, where the read-out data does not have the format unique to BD-ROM, for example, where it is BD-RE format data or BD-R format data, the VDP system 21 determines that the loaded optical disc is a normal BD-R, and continues the data reproduction operation (S34).

Further, although BD-ROM format data is recorded in the data area of a BD-R disc, separate copyright allowance information may additionally be recorded, and a normal data reproduction operation can be carried out if it can be determined that duplication of data was authorized, based on the copyright allowance information.

As apparent from the above description, exemplary embodiments of the present invention provide a high-density, optical disc, such as BD-ROM, capable of preventing unauthorized duplication of data streams, written thereon, onto a BD-RE or BD-R, and a method for restricting playback of high-density optical discs duplicated illegally in an optical disc apparatus.

Although the exemplary embodiments of the invention have been disclosed for illustrative purposes, those skilled in the art will appreciate that various modifications, additions and substitutions are possible, without departing from the scope and spirit of the invention as disclosed in the accompanying claims.

We claim:

1. A computer readable medium including an information area including a lead-in area, a data area and a lead-out area, each area including a plurality of sectors with sector identifiers, comprising:
    disc identification information identifying the type of the computer readable medium and recorded in an area preceding the lead-in area, wherein the type of the computer readable medium is one of Read-Only, Recordable, and Rewritable types, the disc identification information recorded as a physical mark and used to control data recording or reproduction to or from the data area,
    wherein data is recorded in the data area in a format unique to the type of the computer readable medium so that reproduction of the data recorded in the data area of the computer readable medium is selectively restricted based on comparison between the disc identification information and the format of the data,
    wherein the reproduction of the data recorded in the data area is performed when the disc identification information indicates the Read-Only type and the format of the data is the Read-Only format, and the reproduction of the data recorded in the data area is not performed when the disc identification information does not indicate the Read-Only type and the format of the data is the Read-Only format, and
    wherein the physical mark is recorded to have a pattern of repeated mark/space pairs with respect to a monotone high-frequency modulated groove, each mark/space pair consists of a mark and a space each having a length, and the length of the marks and spaces in each section of 36T is determined in accordance with a data value associated with the section such that all marks and spaces in the section of a value of "1" have a length of 3T, and all marks and spaces in the section of a value of "0" have a length of 9T.

2. A method of forming a recording medium including an information area including a lead-in area, a data area and a lead-our area, comprising:
    forming disc identification information identifying the type of the recording medium in an area preceding the lead-in area, wherein the type of recording medium is one of Read-Only, Recordable, and Rewritable types, the disc identification information recorded as a physical mark and used to control data recording or reproduction to or from the data area,
    wherein data is recorded in the data area of the recording medium in a format unique to the type of the recording medium so that reproduction of the data recorded in the data area of the recording medium is selectively restricted based on comparison between the disc identification information and the format of the data,
    wherein the reproduction of the data recorded in the data area is performed when the disc identification information indicates the Read-Only type and the format of the data is the Read-Only format, and the reproduction of the data recorded in the data area is not performed when the disc identification information does not indicate the Read-Only type and the format of the data is the Read-Only format, and
    wherein the forming step forms the physical mark to have a pattern of repeated mark/space pairs with respect to a monotone high-frequency modulated groove, each mark/space pair consisting of a mark and a space each having a length, the length of the marks and spaces in each section of 36T being determined in accordance with a data value associated with the section such that all marks and spaces in the section of a value of "1" have a length of 3T, and all marks and spaces in the section of a value of "0" have a length of 9T.

3. A method of reproducing data from a recording medium including an information area including a lead-in area, a data area and a lead-out area, comprising:
    utilizing disc identification information recorded in an area preceding the lead-in area, wherein the type of recording medium is one of Read-Only, Recordable, and Rewritable types, the disc identification information recorded as a physical mark and used to control data recording or reproduction to or from the data area; and
    reproducing data recorded in the data area in a format unique to the type of the recording medium wherein the reproduction of the data recorded in the data area is selectively restricted based on comparison between the disc identification information and the format of the data,
    wherein the reproduction of the data recorded in the data area is performed when the disc identification information indicates the Read-Only type and the format of the data is the Read-Only format, and the reproduction of the data recorded in the data area is not performed when the disc identification information does not indicate the Read-Only type and the format of the data is the Read-Only format, and
    wherein the physical mark is recorded to have a pattern of repeated mark/space pairs with respect to a monotone high-frequency modulated groove, each mark/space pair consists of a mark and a space each having a length, and the length of the marks and spaces in each section of 36T is determined in accordance with a data value associated with the section such that all marks and spaces in the section of a value of "1" have a length of 3T, and all marks and spaces in the section of a value of "0" have a length of 9T.

4. The method of reproducing data according to claim 3, wherein the disc identification information is read during an initial stage of a servo operation.

5. An apparatus for reproducing data from a recording medium, wherein the recording medium includes an information area including a lead-in area, a data area and a lead-out area, comprising:
a pickup; and
a controller configured to control the pickup to read disc identification information recorded in an area preceding the lead-in area, the disc identification information recorded as a physical mark for controlling data reproduction from the data area and to reproduce data recorded in a format unique to a type of the recording medium from the data area so that reproduction of the data recorded in the data area of the computer readable medium is selectively restricted based on comparison between the disc identification information and the format of the data,
wherein the type of recording medium is one of Read-Only, Recordable, and Rewritable types;
wherein the controller controls to perform the reproduction of the data recorded in the data area when the disc identification information indicates the Read-Only type and the format of the data is the Read-Only format, and not to perform the reproduction of the data recorded in the data area when the disc identification information does not indicate the Read-Only type and the format of the data is the Read-Only format, and
wherein the physical mark is recorded to have a pattern of repeated mark/space pairs with respect to a monotone high-frequency modulated groove, each mark/space pair consists of a mark and a space each having a length, and the length of the marks and spaces in each section of 36T is determined in accordance with a data value associated with the section such that all marks and spaces in the section of a value of "1" have a length of 3T, and all marks and spaces in the section of a value of "0" have a length of 9T.

6. The apparatus of claim 5, wherein the controller is configured to control the reproduction by utilizing the disc identification information.

7. The apparatus of claim 6, wherein the controller is configured to control the pickup to read the disc identification information from BCA (Burst Cutting Area) during an initial stage of a servo operation.

8. The computer readable medium of claim 1, wherein the disc identification information has been recorded as a format unique to Blu-ray disc.

* * * * *